(12) United States Patent
Vijayan et al.

(10) Patent No.: US 8,422,434 B2
(45) Date of Patent: Apr. 16, 2013

(54) PEAK-TO-AVERAGE POWER RATIO MANAGEMENT FOR MULTI-CARRIER MODULATION IN WIRELESS COMMUNICATION SYSTEMS

(75) Inventors: Rajiv Vijayan, San Diego, CA (US);
Avneesh Agrawal, San Diego, CA (US);
Sanjay Jha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1087 days.

(21) Appl. No.: 10/368,733

(22) Filed: Feb. 18, 2003

(65) Prior Publication Data
US 2004/0162097 A1 Aug. 19, 2004

(51) Int. Cl.
*H04W 4/00* (2009.01)

(52) U.S. Cl.
USPC ............. 370/329; 455/522; 455/69; 455/450; 455/63.1; 455/407

(58) Field of Classification Search .............. 455/522, 455/116, 127.1, 127.2, 69, 67.13, 450, 452.2, 455/453, 63.1, 407, 408, 440, 561; 375/296, 375/297, 222, 295; 370/210, 208, 430, 318, 370/336, 337, 347
See application file for complete search history.

(56) References Cited

U.S. PATENT DOCUMENTS

| | | | | |
|---|---|---|---|---|
| 5,726,978 | A * | 3/1998 | Frodigh et al. | 370/252 |
| 6,005,893 | A * | 12/1999 | Hyll | 375/260 |
| 6,144,696 | A * | 11/2000 | Shively et al. | 375/222 |
| 6,175,550 | B1 | 1/2001 | Van Nee | |
| 6,259,746 | B1 * | 7/2001 | Levin et al. | 375/295 |
| 6,359,873 | B1 * | 3/2002 | Kobayashi | 370/338 |
| 6,385,462 | B1 * | 5/2002 | Baum et al. | 455/522 |
| 6,393,276 | B1 * | 5/2002 | Vanghi | 455/422.1 |

(Continued)

FOREIGN PATENT DOCUMENTS

| | | |
|---|---|---|
| EP | 0345463 | 12/1989 |
| EP | 0869647 | 10/1998 |

(Continued)

OTHER PUBLICATIONS

"Method for Reducing the Peak to Average of a Multi-Carrier Waveform" Jack A. Smith et al, IEEE 2000 (0-7803-5718-3/00).*

(Continued)

*Primary Examiner* — Temesghen Ghebretinsae
*Assistant Examiner* — Richard Chan
(74) *Attorney, Agent, or Firm* — Liberty E. Mann

(57) ABSTRACT

Techniques for managing peak-to-average power ratio (PAPR) for multi-carrier modulation in wireless communication systems. Different terminals in a multiple-access system may have different required transmit powers. The number of carriers to allocate to each terminal is made dependent on its required transmit power. Terminals with higher required transmit powers may be allocated fewer carriers (associated with smaller PAPR) to allow the power amplifier to operate at higher power levels. Terminals with lower required transmit powers may be allocated more carriers (associated with higher PAPR) since the power amplifier is operated at lower power levels. The specific carriers to assign to the terminals may also be determined by their transmit power levels to reduce out-of-band emissions. Terminals with higher required transmit powers may be assigned with carriers near the middle of the operating band, and terminals with lower required transmit powers may be assigned with carriers near the band edges.

29 Claims, 7 Drawing Sheets

U.S. PATENT DOCUMENTS

| | | | |
|---|---|---|---|
| 6,411,817 B1* | 6/2002 | Cheng et al. | 455/522 |
| 6,477,388 B1* | 11/2002 | Schmutz | 455/522 |
| 6,542,742 B2* | 4/2003 | Schramm et al. | 455/436 |
| 6,618,365 B1* | 9/2003 | Vannatta et al. | 370/333 |
| 6,694,148 B1* | 2/2004 | Frodigh et al. | 455/522 |
| 6,732,281 B1* | 5/2004 | Mantri et al. | 713/300 |
| 6,751,444 B1* | 6/2004 | Meiyappan | 455/69 |
| 6,845,082 B2 | 1/2005 | Bourget et al. | |
| 6,961,369 B1* | 11/2005 | Tzannes | 375/220 |
| 7,003,044 B2* | 2/2006 | Subramanian et al. | 375/260 |
| 7,187,657 B2* | 3/2007 | Koide et al. | 370/252 |
| 7,194,022 B2 | 3/2007 | Honkanen et al. | |
| 7,206,317 B2 | 4/2007 | Cimini et al. | |
| 7,317,750 B2 | 1/2008 | Shattil | |
| 7,319,883 B2* | 1/2008 | Brusch et al. | 455/522 |
| 7,345,990 B2 | 3/2008 | Son | |
| 7,363,039 B2* | 4/2008 | Laroia et al. | 455/448 |
| 7,397,859 B2 | 7/2008 | McFarland | |
| 7,418,043 B2 | 8/2008 | Shattil | |
| 7,426,395 B2 | 9/2008 | Stephens | |
| 7,453,906 B2* | 11/2008 | Simonnet et al. | 370/469 |
| 7,787,899 B1* | 8/2010 | Talley et al. | 455/522 |
| 7,916,654 B2* | 3/2011 | Koide et al. | 370/252 |
| 7,924,736 B2* | 4/2011 | Cioffi et al. | 370/252 |
| 7,929,472 B2* | 4/2011 | Gu et al. | 370/310 |
| 2001/0022777 A1* | 9/2001 | Bourget et al. | 370/210 |
| 2001/0031014 A1* | 10/2001 | Subramanian et al. | 375/260 |
| 2001/0055282 A1* | 12/2001 | Knisely et al. | 370/328 |
| 2002/0006167 A1* | 1/2002 | McFarland | 375/260 |
| 2002/0048334 A1* | 4/2002 | Hasegawa | 375/360 |
| 2002/0105947 A1 | 8/2002 | Kitagawa et al. | |
| 2002/0147017 A1 | 10/2002 | Li et al. | |
| 2002/0159422 A1 | 10/2002 | Li et al. | |
| 2002/0181489 A1 | 12/2002 | Kitagawa et al. | |
| 2003/0069035 A1* | 4/2003 | Shurvinton | 455/522 |
| 2003/0092462 A1* | 5/2003 | Dartois | 455/522 |
| 2003/0227964 A1* | 12/2003 | Honkanen et al. | 375/216 |
| 2003/0231581 A1* | 12/2003 | Son | 370/208 |
| 2004/0023630 A1 | 2/2004 | Kayano et al. | |
| 2004/0053630 A1* | 3/2004 | Ramos et al. | 455/500 |
| 2004/0066795 A1* | 4/2004 | Zhang | 370/442 |
| 2004/0081201 A1* | 4/2004 | Simonnet et al. | 370/469 |
| 2004/0086027 A1* | 5/2004 | Shattil | 375/146 |
| 2004/0141548 A1* | 7/2004 | Shattil | 375/146 |
| 2004/0162097 A1* | 8/2004 | Vijayan et al. | 455/522 |
| 2005/0259569 A1* | 11/2005 | Cimini et al. | 370/208 |
| 2006/0007883 A1* | 1/2006 | Tong et al. | 370/328 |
| 2008/0037413 A1* | 2/2008 | Gu et al. | 370/210 |
| 2008/0205501 A1* | 8/2008 | Cioffi et al. | 375/224 |
| 2009/0040975 A1 | 2/2009 | Vijayan et al. | |
| 2010/0034323 A1 | 2/2010 | Stoye | |
| 2010/0067474 A1 | 3/2010 | Vijayan et al. | |
| 2010/0124293 A1 | 5/2010 | Rajagopal | |
| 2010/0124296 A1 | 5/2010 | Rajagopal | |
| 2010/0177847 A1 | 7/2010 | Woodward | |
| 2011/0164519 A1* | 7/2011 | Nishio et al. | 370/252 |

FOREIGN PATENT DOCUMENTS

| | | |
|---|---|---|
| JP | 4291832 | 10/1992 |
| JP | 5300030 | 11/1993 |
| JP | 2000269918 | 9/2000 |
| JP | 2001103034 | 4/2001 |
| JP | 2001339361 | 12/2001 |
| JP | 200244052 | 2/2002 |
| JP | 200294479 | 3/2002 |
| JP | 2003158500 | 5/2003 |
| JP | 2004187257 | 7/2004 |
| JP | 2004214746 | 7/2004 |
| WO | 9815153 | 4/1998 |
| WO | WO03003646 A2 | 1/2003 |

OTHER PUBLICATIONS

"Reduced Search for Optimum Code Sets to Reduce PAPR in MC-CDMA System" Kunseok et al, IEEE 2002 (0-7803-7442-8/02).*

Wiegandt, et al., "Overcoming Peak-to-Average Power Ratio Issues in OFDM Via Carrier-Interferometry Codes," IEEE Vehicular Technology Conference, 2001, vol. 2, Oct. 7-11, 2001, pp. 660-663.

Lawrey, et al., "Peak to Average Power Ratio Reduction of OFDM Signals Using Peak Reduction Carriers," IEEE Signal Processing and its Applications, vol. 2, Aug. 22-25, 1999, pp. 737-740.

Zekri, et al., "Peak-to-Average Power Reduction for Mulitcarrier," Belgium, 4 pages.

International Search Reprot—PCT/US04/004667—International Search Authority, US—Feb. 1, 2006.

Written Opinion—PCT/US04/004667—International Search Authority, US—Feb. 1, 2006.

International Preliminary Report on Patenability—PCT/US04/004667—The International Bureau of WIPO, Geneva, Switzerland—Mar. 6, 2006.

"Digital Video Broadcasting (DVB); Interaction channel for Digital Terrestrial Television (RCT) incorporating multiple access OFDM," ETSI Standards, ETSI EN 301 958 v1.1.1, Mar. 1, 2002, pp. 147-148.

Fujii, et al.: "Best effort cell structure using sub-carrier selection MC-CDMA system" The transactions of the institute of electronics, information, and communications engineers, Nov. 15, 2002, pp. 65-72, IEICE Technical Report RCS 2002-203.

Li, et al.: "Study of air interface techniques for wireless LANs" Jan. 1, 1993, pp. 4/1-4/7, p. 3.

European Search Report—EP04711906—Search Authority—Munich—Aug. 19, 2009.

European Search Report—EP11168263—Search Authority—Munich—Dec. 12, 2011.

* cited by examiner

PEAK-TO-AVERAGE POWER RATIO MANAGEMENT FOR MULTI-CARRIER MODULATION IN WIRELESS COMMUNICATION SYSTEMS

BACKGROUND

I. Field

The present invention relates generally to data communication, and more specifically to techniques for managing peak-to-average power ratio (PAPR) for multi-carrier modulation in wireless communication systems.

II. Background

Wireless communication systems are widely deployed to provide various types of communication such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

A wireless communication system may employ multi-carrier modulation for data transmission. Common examples of multi-carrier modulation include orthogonal frequency division multiplexing (OFDM) and discrete multi-tone (DMT). OFDM effectively partitions the overall system bandwidth into a number of orthogonal subbands. Each subband is associated with a respective carrier upon which data may be modulated. The carriers for the subbands may be independently modulated with data, and the modulated carriers are then added together to generate an output waveform.

Multi-carrier modulation has certain desirable characteristics, including the ability to combat multipath effects. However, a major drawback with multi-carrier modulation is high peak-to-average power ratio (PAPR) for the output waveform, i.e., the ratio of the peak power to the average power of the waveform generated by multi-carrier modulation can be high. The high PAPR results from possible in-phase (or coherent) addition of all the carriers when they are independently modulated with data. In fact, it can be shown that the peak power can be up to N times greater than the average power for multi-carrier modulation, where N is the number of carriers.

The high PAPR for the waveform generated by multi-carrier modulation normally requires the power amplifier to be operated at an average power level that is typically much lower than the peak power level (i.e., backed off from peak power). This is because large peaks in the waveform may cause the power amplifier to operate in a highly non-linear region or possibly clip, which would then cause intermodulation distortion and other artifacts that can degrade signal quality. By operating the power amplifier at a back-off from peak power, where the back-off typically ranges from 4 to 7 dB, the power amplifier can handle large peaks in the waveform without generating excessive distortion. However, the back-off represents inefficient operation of the power amplifier during other times when large peaks are not present in the waveform. Thus, it is highly desirable to minimize the PAPR of the waveform so that the power amplifier can be operated closer to the peak power level if desired or necessary.

Various schemes have been introduced to minimize PAPR for multi-carrier modulation. Most of these schemes strive to reduce the PAPR of the waveform itself. For example, one conventional scheme proposes mapping the data to be transmitted into specific codewords that have been specially selected because they are associated with low PAPRs. Another conventional scheme proposes using "peak reduction carriers" that are modulated in a manner to reduce peaks in the waveform. Yet another conventional scheme proposes modulating data on all carriers but with different phases to attempt to reduce the PAPR of the waveform. These various conventional schemes for reducing PAPR may not be applicable for certain multi-carrier communication systems. This may be the case, for example, if the data for all carriers is not available or accessible, as described below.

There is therefore a need in the art for techniques for managing PAPR for multi-carrier modulation in wireless communication systems.

SUMMARY

Techniques are provided herein for managing PAPR in various wireless multiple-access multi-carrier communication systems (e.g., OFDMA systems). It is recognized that different terminals in a multiple-access communication system may be associated with different required transmit powers to achieve their desired received signal qualities. Carriers may be assigned to terminals based on their required transmit powers.

In an aspect, the number of carriers to allocate to each terminal is made dependent on its required transmit power. Fewer carriers may be allocated to a terminal with a higher required transmit power. Since a smaller PAPR is associated with a waveform generated with fewer carriers, the power amplifier may be operated with a smaller back-off and the waveform may be transmitted at a higher power level. Conversely, more carriers may be allocated to a terminal with a lower required transmit power. Even though a larger PAPR is associated with a waveform generated with more carriers, the power amplifier can provide the larger back-off since the required transmit power is lower.

In another aspect, the specific carriers to assign to the terminals are determined by their transmit power levels. Terminals with higher required transmit powers are more likely to generate high levels of intermodulation distortion. These terminals may be assigned with carriers near the middle of the operating band so that their distortion may fall within the operating band. Conversely, terminals with lower required transmit powers are likely to generate low levels of intermodulation distortion. These terminals may be assigned with carriers near the edges of the operating band since the distortion will likely be below specified out-of-band emission requirements.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
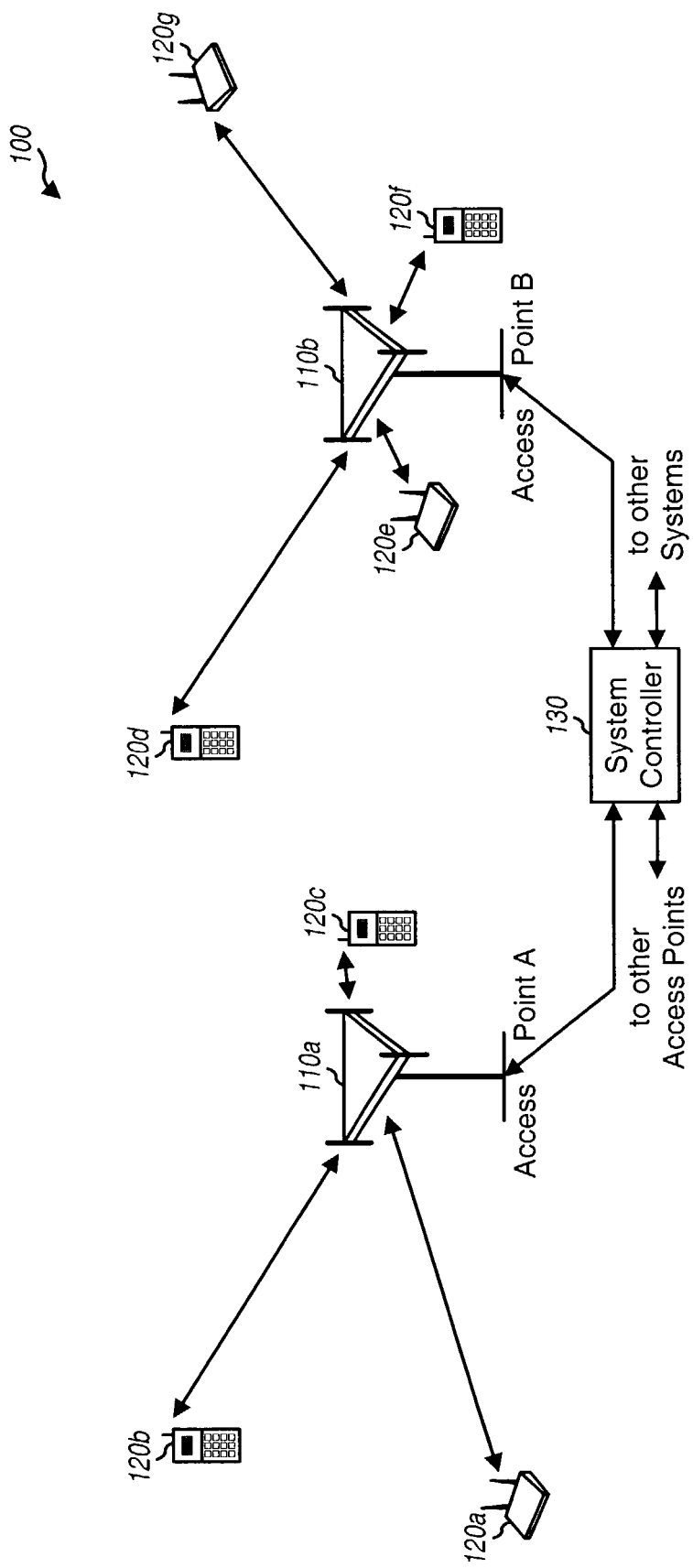
FIG. 1 shows a diagram of a wireless multiple-access communication system.

FIG. 1 shows a diagram of a wireless multiple-access communication system 100 that employs multi-carrier modulation. System 100 includes a number of access points 110 that communicate with a number of terminals 120 (only two access points 110a and 110b are shown in FIG. 1 for simplicity). An access point is a fixed station that is used for communicating with the terminals. An access point may also be referred to as a base station or some other terminology.

A terminal is a station that communicates with the access point. A terminal may also be referred to as an access terminal, a user terminal, a remote station, a mobile station, a wireless communication device, or some other terminology. Each terminal may communicate with one or multiple access points on the downlink and/or uplink at any given moment. The downlink (i.e., forward link) refers to transmission from the access point to the terminal, and the uplink (i.e., reverse link) refers to transmission from the terminal to the access point.

A system controller 130 couples to the access points and may further couple to other systems/networks (e.g., a packet data network). System controller 130 provides coordination and control for the access points coupled to it. Via the access points, system controller 130 further controls the routing of data among the terminals, and between the terminals and other users coupled to the other systems/networks.

The techniques described herein for managing PAPR may be implemented in various wireless multiple-access multi-carrier communication systems. For example, system 100 may be an OFDMA system that utilizes OFDM for data transmission. Moreover, these techniques may be used for the uplink as well as the downlink. For clarity, these techniques are described specifically for the uplink in an OFDMA system. In the following description, an active terminal is one that is scheduled for data transmission on the uplink (and possibly the downlink).

Figure 2:
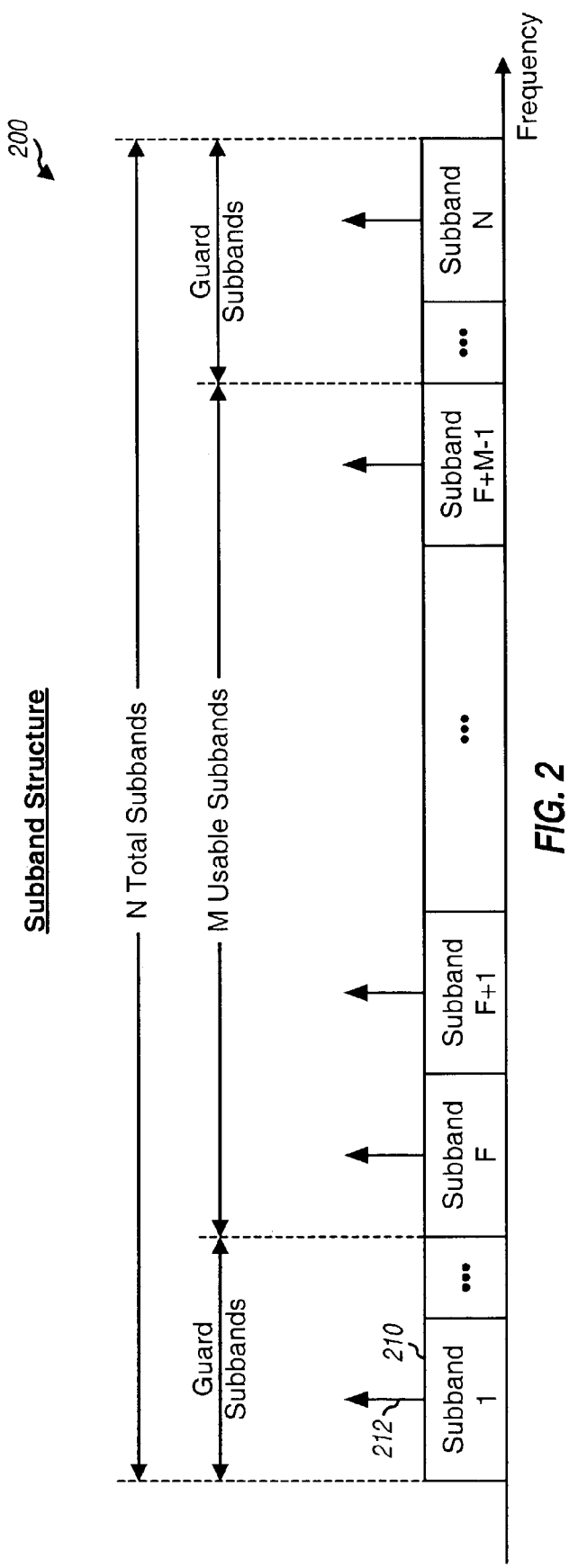
FIG. 2 shows a subband/carrier structure that may be used for an OFDMA system.

FIG. 2 shows a subband/carrier structure 200 that may be used for an OFDMA system. The system has an overall system bandwidth of W MHz, which is partitioned into N orthogonal subbands 210 using OFDM. Each subband has a bandwidth of W/N MHz and is associated with a respective carrier 212 upon which data may be modulated.

In a typical OFDM system, only M of the N total carriers are used for data transmission, where M<N. The remaining N−M carriers are not used for data transmission and their associated subbands serve as guard subbands to allow the system to meet spectral mask requirements. The M usable carriers include carriers F through F+M−1, where F is an integer normally selected such that the M usable carriers are centered in the middle of the operating band.

For OFDM, up to N carriers for the N subbands may be independently modulated with data. The modulated carriers are then added together to form an output waveform. The modulated carriers may add coherently (i.e., in-phase), in which case there will be a large amplitude in the waveform. It can be shown that the peak power of the waveform generated with N independently modulated carriers can be many times greater than the average power of the waveform. The exact value for PAPR depends on many factors. Moreover, the value of interest is often not the absolute peak value but some statistical value, e.g., what value of instantaneous power is exceeded say 99% of the time.

Figure 3A:
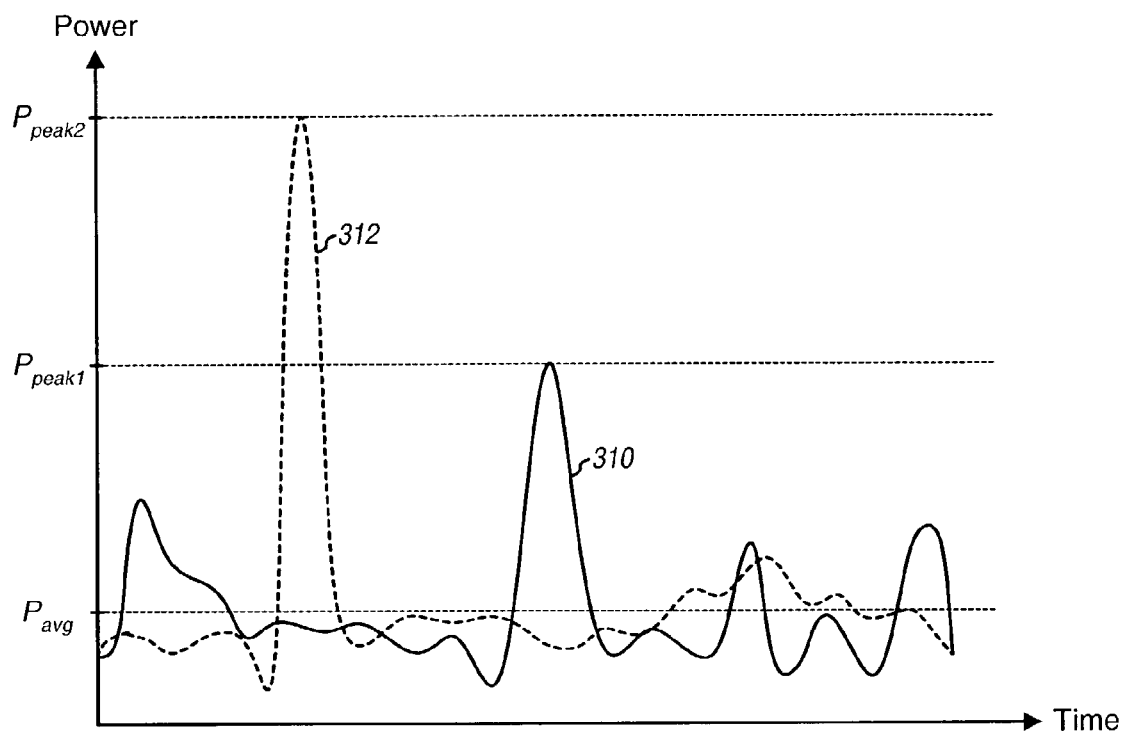
FIG. 3A shows two hypothetical waveforms generated by multi-carrier modulation.

FIG. 3A shows plots of two hypothetical waveforms 310 and 312 that are generated by multi-carrier modulation. The horizontal axis denotes time and the vertical axis denotes power. Waveform 310 is generated with L carriers, and waveform 312 is generated with 2·L carriers, where L may be any integer greater than one. The average power of waveform 310 is the same as that of waveform 312. However, the peak power of waveform 312 is twice that of waveform 310 because twice the number of carriers was used to generate waveform 312. Consequently, the PAPR of waveform 312 is larger than the PAPR of waveform 310.

A waveform generated by multi-carrier modulation is typically transmitted in a manner to limit the amount of inter-modulation distortion. This requires the power amplifier for the waveform to be operated at an average power level, $P_{avg}$, that is reduced or backed off from the peak or maximum power level, $P_{max}$, for the power amplifier. The amount to back off is selected such that the power amplifier does not (or minimally) operate in a highly non-linear region or clip. More specifically, the back-off is normally selected such that the distortion generated by the power amplifier is limited to a particular level.

Figure 3B:
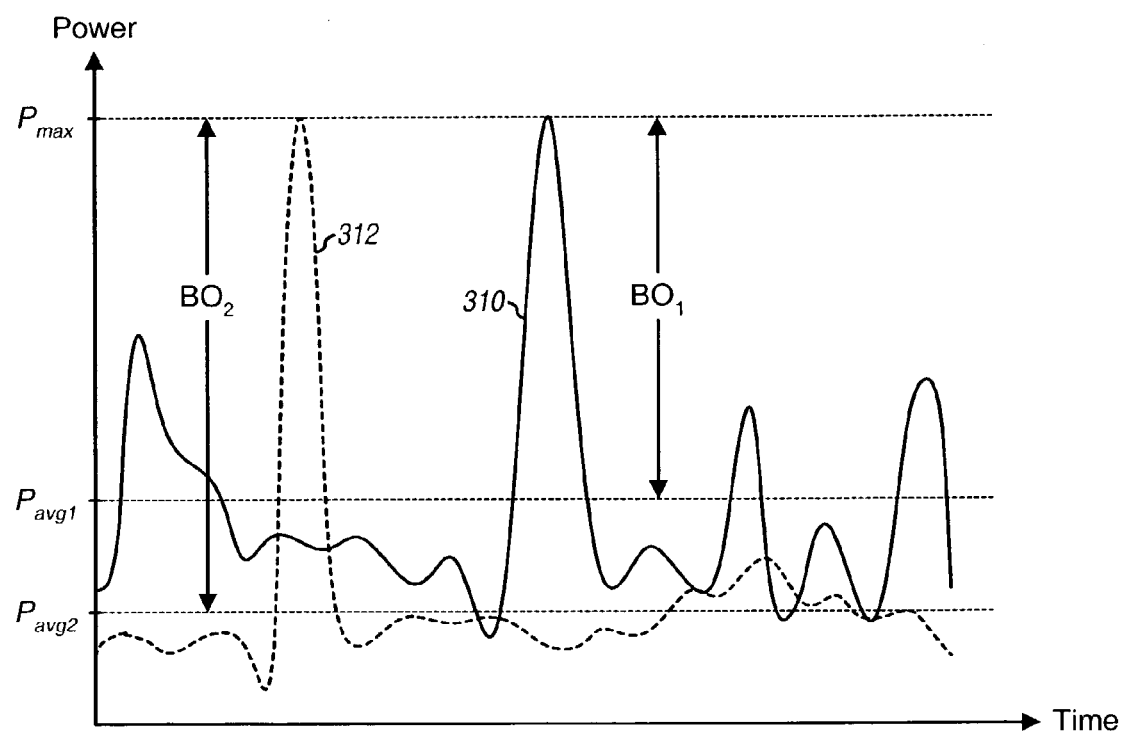
FIG. 3B shows transmission of the two waveforms with a maximum transmit power of $P_{max}$ and in a manner to minimize intermodulation distortion.

FIG. 3B shows the transmission of the two waveforms in FIG. 3A with the maximum transmit power of $P_{max}$ and in a manner to minimize distortion. Waveform 310 may be transmitted with a back-off of $BO_1$, which is determined in part by the $PAPR_1$ for this waveform (e.g., $BO_1 \leq PAPR_1$). Similarly, waveform 312 may be transmitted with a back-off of $BO_2$, which is determined in part by the $PAPR_2$ for this waveform (e.g., $BO_2 \leq PAPR_2$). The average transmit power ($P_{avg1}$) of waveform 310 may be approximately twice the average transmit power ($P_{avg2}$) of waveform 312 while still limiting the distortion to approximately the same level. The exact ratio of $P_{avg1}$ to $P_{avg2}$ is dependent on the specific back-offs used for waveforms 310 and 312.

For an OFDMA system, the M usable carriers may be shared among multiple active terminals. On the uplink, each active terminal may be allocated a specific set of carriers upon which it may transmit data. The number of carriers to allocate to each active terminal and which specific carriers to assign to the terminal may both be determined as described below. The carriers assigned to each terminal may or may not be contiguous. Each active terminal may then transmit using its specific assigned carriers.

Referring back to FIG. 1, the terminals may be dispersed throughout the system. Each terminal is associated with a particular path loss to its access point, which is largely dependent on the distance between the terminal and the access point. Each terminal also requires a particular received signal quality at the access point to achieve a target level of performance. The required received signal quality may be quantified by a particular received signal-to-noise ratio (SNR), and the target level of performance may be quantified by a particular frame error rate (FER), packet error rate (PER), and so on. The required transmit power for each terminal is dependent on its path loss and its required received signal quality.

If the terminals are dispersed throughout the system, then the path loss is typically different from terminal to terminal. Moreover, the desired received signal quality may be different from terminal to terminal depending, for example, on their data rates. Thus, the required transmit power is typically different from terminal to terminal. In general, terminals that are located farther away from the access point have greater path losses to the access point and would then require higher transmit powers to achieve a given received signal quality. For example, terminals 120a, 120b, 120d, and 120g will likely require more transmit power than terminals 120c, 120e, and 120f to achieve the same received signal quality at their respective access points.

Each terminal is associated with a particular maximum transmit power, $P_{max}$, that may be used for data transmission. This maximum transmit power may be determined by regulatory constraints, system design, and/or limitations of the power amplifier used by the terminal. The maximum amount of transmit power that may be used for uplink data transmission would then be limited to $P_{max}$.

A power control loop may be maintained to control the transmit power of each active terminal. Because a large disparity may exist in the path losses for the active terminals, the received powers at the access point for these terminals may vary by a large amount (e.g., by as much as 80 dB) if these terminals all transmit at the same power level. Even though orthogonal subbands are generated by OFDM, the uplink transmissions from the active terminals may interfere with one other due to, for example, offsets in their timing and/or frequency. To limit the amount of interference to nearby carriers, the transmit power of each active terminal may be controlled or adjusted such that the received signal quality for the terminal is within an acceptable range. The required transmit power for each terminal would then be determined based on the uplink power control, which may be coarse.

In an aspect, the number of carriers to allocate to each active terminal is dependent on its required transmit power. Thus, different numbers of carriers may be allocated to different terminals depending on their required transmit powers. Higher transmit power is required to achieve the desired received signal quality when the path loss is greater. If higher transmit power is required, then fewer carriers may be allocated. Since a smaller PAPR is associated with a waveform generated with fewer carriers, the power amplifier may be operated with a smaller back-off and the waveform may be transmitted at higher power level. Conversely, since lower transmit power is required when the path loss is smaller, more carriers may be allocated. Even though a larger PAPR is associated with a waveform generated with more carriers, the power amplifier can provide the larger back-off since the required transmit power for the waveform is lower.

Figure 3C:
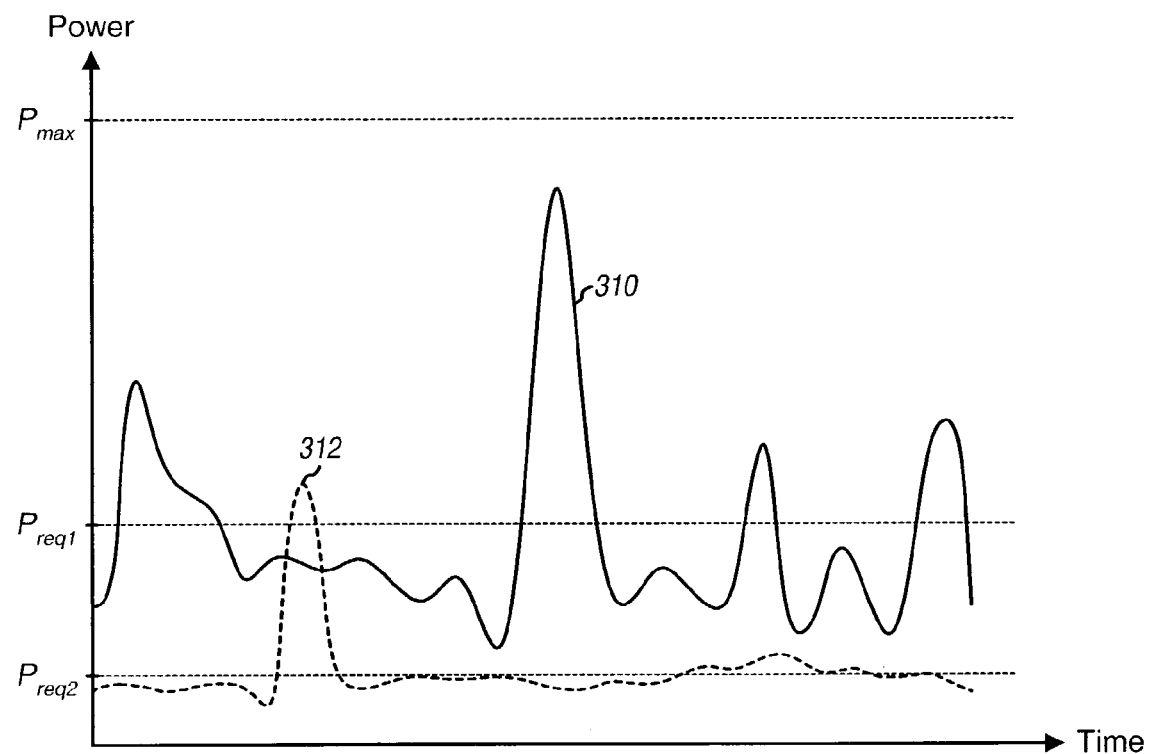
FIG. 3C shows transmission of the two waveforms, given the maximum transmit power of $P_{max}$ and using power control to attain the desired received signal quality.

FIG. 3C shows the transmission of the two waveforms in FIG. 3A, given the maximum transmit power of $P_{max}$ and using power control to attain the desired received signal quality. Waveform 310 is transmitted with a required average power of $P_{req1}$, which is backed off by at least $BO_1$ from $P_{max}$. Waveform 312 is transmitted with a required average power of $P_{req2}$, which is backed off by at least $BO_2$ from $P_{max}$. The required average powers of $P_{req1}$ and $P_{req2}$ may be determined by the path losses and the required received signal qualities associated with the terminals transmitting these waveforms. The higher required average power for waveform 310 may be due to a greater path loss and/or a higher required received signal quality for the waveform. The back-offs of $BO_1$ and $BO_2$ may be determined based on the PAPRs of these waveforms, as described above.

As shown in FIG. 3C, for a power amplifier constrained by the maximum transmit power of $P_{max}$, the higher required average power of $P_{req1}$ for waveform 310 can be provided by the power amplifier since this waveform is generated with fewer carriers and is associated with a smaller back-off. Even though waveform 312 is generated with more carriers and is associated with a larger back-off, the required average power of $P_{req2}$ for this waveform can also be provided by the power amplifier since this power level is lower.

The maximum number of carriers that may be allocated to each active terminal may thus be made dependent on the required transmit power and the maximum transmit power for the terminal. The determination of the maximum number of carriers that may be allocated to each terminal may be made based on various schemes, two of which are described below.

In a first carrier allocation scheme, a table is formed for maximum allowed average power versus number of carriers. This table can include one entry for each possible number of carriers that may be assigned. For example, the table may include N entries for N carriers, where i denotes the number of carriers for the i-th entry in the table. For each entry, the highest average power $P_{mavg,i}$ that may be used for the associated number of carriers, i, is determined (e.g., empirically, by simulation, or via some other means). This maximum allowed average power, $P_{mavg,i}$, is based on an assumption of the maximum transmit power of $P_{max}$ for the terminals (which may be specified for the system or by regulatory constraints). The table may be formed as shown in TABLE 1.

TABLE 1

| Number of Carriers | Maximum Allowed Average Power |
|---|---|
| N | $P_{mavg,N}$ |
| . | . |
| . | . |
| . | . |
| i | $P_{mavg,i}$ |
| . | . |
| . | . |
| . | . |
| 1 | $P_{mavg,1}$ |

Since waveforms with more carriers are associated with larger back-offs, the maximum allowed average power decreases with increasing number of carriers (i.e., $P_{mavg,1} > P_{mavg,2} > \ldots > P_{mavg,N}$)

The maximum number of carriers that may be allocated to each active terminal may then be determined based on the required transmit power, $P_{req}$, for the terminal and the table. In particular, the required transmit power for the terminal may be compared against the maximum allowed average powers in the table. The smallest maximum allowed average power ($P_{mavg,S}$) that is higher than or equal to $P_{req}$ is identified, and the number of carriers S associated with this $P_{mavg,S}$ is determined. The terminal may then be allocated any number of carriers less than or equal to S.

In a second carrier allocation scheme, a table is formed for required back-offs versus number of carriers. This table can also include one entry for each possible number of carriers that may be assigned. For each entry, the minimum back-off $BO_i$ required for the associated number of carriers, i, is determined (e.g., empirically, by simulation, or via some other means). This table may be formed as shown in TABLE 2.

TABLE 2

| Number of Carriers | Required Back-off |
|---|---|
| N | $BO_N$ |
| . | . |
| . | . |
| . | . |
| i | $BO_i$ |
| . | . |
| . | . |
| . | . |
| 1 | $BO_1$ |

Waveforms with more carriers are associated with larger back-offs, so that $BO_N > \ldots BO_2 > BO_1$.

The maximum number of carriers that may be allocated to each active terminal may then be determined based on the required transmit power and the maximum transmit power for the terminal. In particular, the difference between the maximum and required transmit powers for the terminal is first computed. This computed difference is then compared against the required back-offs in the table. The largest required back-off ($BO_S$) that is less than or equal to this computed difference is then identified, and the number of carriers S associated with this $BO_S$ is determined. The terminal may then be allocated any number of carriers less than or equal to S.

The maximum number of carriers that may be allocated to each active terminal may be determined initially, as described above. The actual number of carriers to allocate to each terminal may then be determined based on any number of additional factors. Such factors may relate to (1) the amount of data to be transmitted, (2) fairness, (3) the priority of the terminals, and so on. The specific number of carriers actually allocated to each terminal is equal to or less than the maximum number of carriers that may be allocated. The specific carriers allocated to each terminal may or may not be contiguous.

Many wireless communication systems are operated in frequency bands with spectral mask requirements that limit the amount of out-of-band emissions. For these systems, which carriers to assign to each active terminal may be selected such that out-of-band emissions is reduced or minimized to the extent possible.

Figure 4:
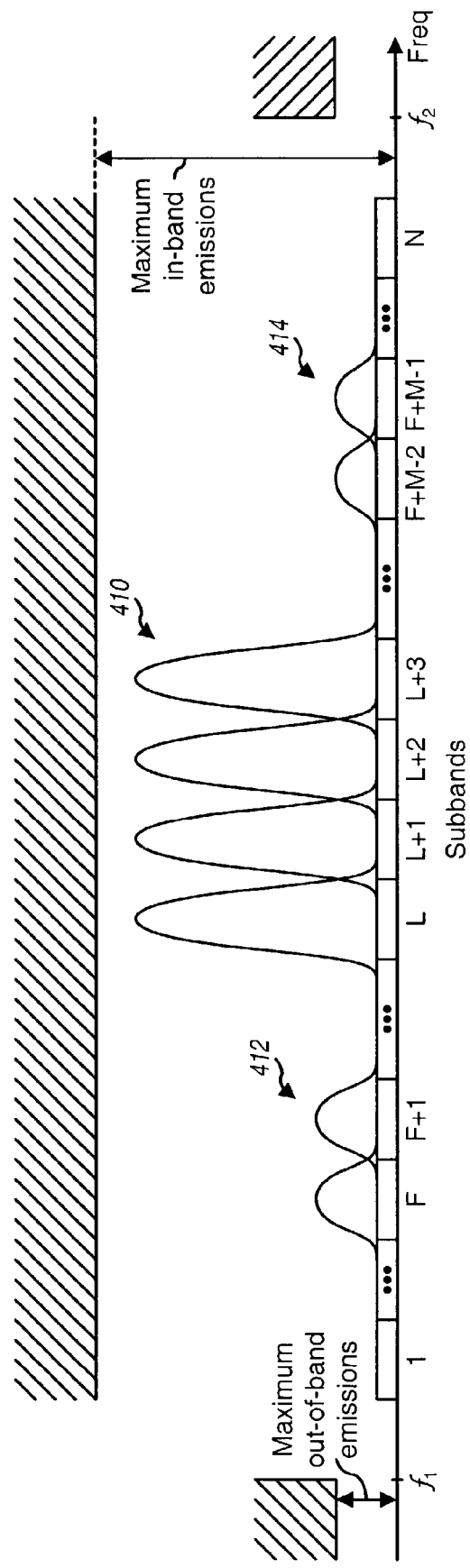
FIG. 4 shows assignment of carriers to terminals in a manner to reduce out-of-band emissions.

FIG. 4 shows typical emission requirements for a typical radio frequency (RF) operating band. The operating band has spectral mask requirements that are characterized by a particular maximum in-band emission and a particular maximum out-of-band emission. The maximum in-band emission may be specified, for example, by a particular per-MHz transmit power constraint. Similarly, the maximum out-of-band emission may be specified by a specific per-MHz transmit power constraint below frequency $f_1$ and above frequency $f_2$.

Power amplifiers are typically designed such that they are linear at low to medium output power levels and become more non-linear at higher output power levels. Thus, when a power amplifier is operated at a high output power level, a higher level of non-linearity in the power amplifier can cause intermodulation distortion that falls outside the signal band. The amount of distortion is dependent on the specific design of the power amplifier and the output power level. If the non-linearity and/or output power level is sufficiently high, then the resultant distortion can exceed the specified maximum out-of-band emission requirement.

In another aspect, the specific carriers to assign to the active terminals are determined by their required transmit powers. A terminal with a higher path loss to the access point (e.g., a terminal located near the edge of the coverage area) and/or a higher required received signal quality needs to transmit at a higher power level to achieve the required received signal quality at the access point. This terminal is thus more likely to generate a high level of intermodulation distortion. The terminal may then be assigned with carriers near the middle of the operating band so that the distortion may fall within the operating band. The higher level of distortion from this terminal may cause additional interference to other carriers, so the transmit powers for these carriers may be increased accordingly to account for the higher level of interference.

Conversely, a terminal with a smaller path loss to the access point (e.g., a terminal located near the access point) and/or a lower required received signal quality can transmit at a lower power level and still achieve the required received signal quality at the access point. This terminal is thus likely to generate a low level of intermodulation distortion. The terminal may then be assigned with carriers near the edges of the operating band since the distortion will likely be below the specified maximum out-of-band emission requirement. The specific carriers allocated to each terminal may be located within a particular portion of the operating band but need not be contiguous.

FIG. 4 also shows the assignment of carriers to active terminals in a manner to reduce out-of-band emissions. A group of carriers 410 near the middle of the operating band may be assigned to a terminal that needs to transmit at a high output power level. Two groups of carriers 412 and 414 near the edges of the operating band may be assigned to the same or different terminals that can transmit at a low output power level. The uplink transmissions on these groups of carriers are from multiple terminals. However, these uplink transmissions are superimposed in the same plot in FIG. 4 for clarity.

In one carrier assignment scheme, carriers are assigned to active terminals based on their required transmit powers. For a given transmission interval, the number of carriers to allocate to each active terminal is first determined (e.g., based on the required transmit power of the active terminal and possibly other factors as described above). The active terminals may be associated with different required transmit powers. The group of carriers to assign to the active terminal with the largest required transmit power is then selected to be near the middle of the operating, the group of carriers for the active terminal with the next largest required transmit power is selected to be those closest to the middle of the operating band, and so on, and the group of carriers for the active terminal with the lowest required transmit power is then selected to be toward the edges of the operating band. This carrier assignment scheme can reduce out-of-band emissions to the extent possible.

In another carrier assignment scheme, each usable carrier is associated with a respective threshold power level, and the carriers are assigned to active terminals based on the threshold power levels and the required transmit powers for the terminals. In particular, a given carrier may be assigned to a terminal if the required transmit power is equal to or less than the threshold power level. The carriers near the middle of the operating band may be associated with higher threshold power levels, and those toward the edges of the band may be associated with lower threshold power levels. These threshold power levels may be selected such that the specified out-of-band emissions can be met for a given multi-carrier modulation scheme. Thus, a terminal located near the edge of the coverage area and having a higher required transmit power may only be assigned carriers near the middle of the operating band, whereas a terminal with a lower required transmit power may be assigned carriers anywhere within the operating band.

The carriers may also be assigned to the active terminals in some other manners to reduce out-of-band emissions, and this is within the scope of the invention. Moreover, the carrier assignment techniques described herein may be used alone or in combination with the carrier allocation techniques described above.

Figure 5:
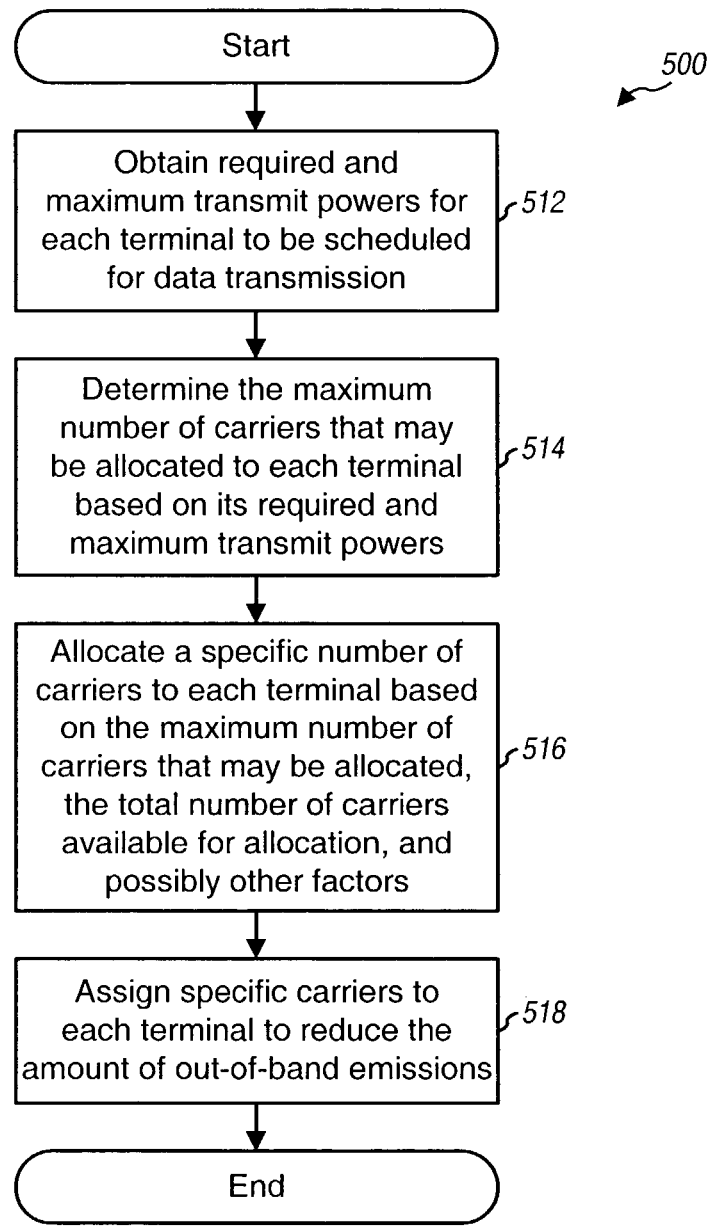
FIG. 5 shows a process to allocate and assign carriers to terminals.

FIG. 5 shows a flow diagram of an embodiment of a process 500 to allocate and assign carriers to active terminals. Initially, pertinent information regarding the transmit power of each terminal to be scheduled for data transmission is obtained (step 512). In an embodiment, the required and maximum transmit powers for each terminal are obtained.

The required transmit power for each terminal may be sent by the terminal or obtained based on some other means. The maximum transmit power for each terminal may be sent by the terminal, known a priori, or obtained based on some other means. In another embodiment, the difference between the maximum and required transmit powers for each terminal is obtained. In yet another embodiment, the maximum transmit power and the initial transmit power for each terminal may be obtained (e.g., during registration), and the required transmit power for the terminal may thereafter be estimated based on the initial transmit power and an accumulation of all power control commands sent to the terminal. The pertinent transmit power information may thus be provided in various forms.

The maximum number of carriers that may be allocated to each terminal is then determined based on the transmit power information (e.g., based on the required and maximum transmit powers) (step 514). This may be achieved by using various schemes such as the two carrier allocation schemes described above. A specific number of carriers is then allocated to each terminal based on (1) the maximum number of carriers that may be allocated to the terminal, (2) the total number of carriers available for allocation to all terminals, and (3) any number of other factors (step 516). The number of carriers allocated to each terminal is bounded by the maximum number that may be allocated. Moreover, the sum of all carriers allocated to the terminals is bounded by the total number of carriers available for allocation.

Specific carriers are then assigned to each terminal in a manner such that the amount of out-of-band emissions may be reduced or minimized (step 518). This may be achieved by using various schemes such as the two carrier assignment schemes described above. The assigned carriers for each terminal may then be signaled to the terminal via a carrier assignment. Each scheduled terminal would then transmit using the specific assigned carriers and for the scheduled time period.

Figure 6:
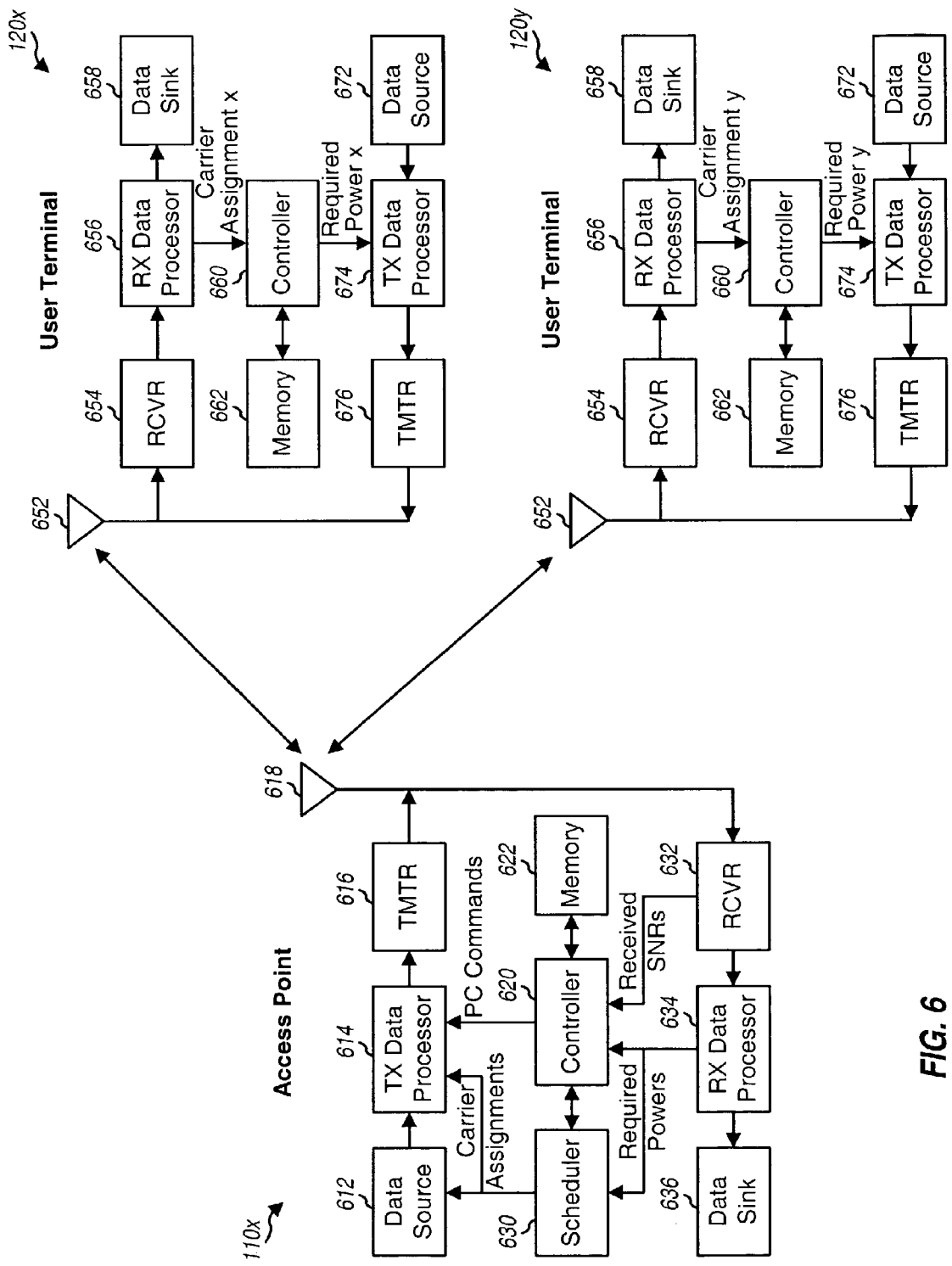
FIG. 6 shows a block diagram of an access point and two terminals.

FIG. 6 shows a block diagram of an embodiment of an access point 110x and two terminals 120x and 120y in multiple-access multi-carrier communication system 100.

On the downlink, at access point 110x, a transmit (TX) data processor 614 receives traffic data (i.e., information bits) from a data source 612 and signaling and other information from a controller 620 and a scheduler 630. For example, controller 620 may provide power control (PC) commands that are used to adjust the transmit power of the active terminals, and scheduler 630 may provide assignments of carriers for the terminals. These various types of data may be sent on different transport channels. TX data processor 614 encodes and modulates the received data using multi-carrier modulation (e.g., OFDM) to provide modulated data (e.g., OFDM symbols). A transmitter unit (TMTR) 616 then processes the modulated data to generate a downlink modulated signal that is then transmitted from an antenna 618.

At each of terminals 120x and 120y, the transmitted downlink modulated signal is received by an antenna 652 and provided to a receiver unit (RCVR) 654. Receiver unit 654 processes and digitizes the received signal to provide samples. A received (RX) data processor 656 then demodulates and decodes the samples to provide decoded data, which may include recovered traffic data, messages, signaling, and so on. The traffic data may be provided to a data sink 658, and the carrier assignment and PC commands sent for the terminal are provided to a controller 660.

Controller 660 directs data transmission on the uplink using the specific carriers that have been assigned to the terminal and indicated in the received carrier assignment. Controller 660 further adjusts the transmit power used for the uplink transmissions based on the received PC commands.

For the uplink, at each active terminal 120, a TX data processor 674 receives traffic data from a data source 672 and signaling and other information from controller 660. For example, controller 660 may provide information indicative of the required transmit power, the maximum transmit power, or the difference between the maximum and required transmit powers for the terminal. The various types of data are coded and modulated by TX data processor 674 using the assigned carriers and further processed by a transmitter unit 676 to generate an uplink modulated signal that is then transmitted from antenna 652.

At access point 110x, the transmitted uplink modulated signals from the terminals are received by antenna 618, processed by a receiver unit 632, and demodulated and decoded by an RX data processor 634. Receiver unit 632 may estimate the received signal quality (e.g., the received signal-to-noise ratio (SNR)) for each terminal and provide this information to controller 620. Controller 620 may then derive the PC commands for each terminal such that the received signal quality for the terminal is maintained within an acceptable range. RX data processor 634 provides the recovered feedback information (e.g., the required transmit power) for each terminal to controller 620 and scheduler 630.

Scheduler 630 uses the feedback information to perform a number of functions such as (1) selecting a set of terminals for data transmission on the uplink and (2) assigning carriers to the selected terminals. The carrier assignments for the scheduled terminals are then transmitted on the downlink for these terminals.

For clarity, the techniques for managing PAPR have been described specifically for the uplink in an OFDMA system. These techniques may also be used for downlink transmission from the access point to the terminals. In one downlink transmission scheme, OFDMA is used for the downlink similar to the uplink, and carrier multiplexing may be used to transmit data to multiple terminals on the downlink simultaneously within a given time interval. In another downlink transmission scheme, data is transmitted to one terminal at a time in a time division multiplex (TDM) manner. For both downlink transmission schemes, the number of carriers to allocate to each terminal and the specific carriers to assign to each terminal may be determined as described above based on the required transmit power for the terminal. For the OFDMA downlink transmission scheme, the available carriers may be assigned to multiple terminals such that the PAPR of the downlink signal for all scheduled terminals is maintained within a particular target. For the TDM-OFDM downlink transmission scheme, the number of carriers assigned to the terminal being served may be selected such that the PAPR of the downlink signal to this terminal is also maintained within the target. Data for each scheduled terminal may then be transmitted using the specific assigned carriers and at the required transmit power for the terminal.

For OFDM, the data to be transmitted on each carrier is first modulated (i.e., symbol mapped) using a particular modulation scheme selected for use for that carrier to provide one modulation symbol for each symbol period. The modulation symbols for each terminal are then scaled to achieve the required transmit power for the terminal. The unused carriers are provided with signal values of zero. For each symbol period, M scaled symbols for M usable carriers and N−M zeros for the unused carriers are transformed to the time domain using an inverse fast Fourier transform (IFFT) to obtain a "transformed" symbol that includes N time-domain samples. To combat intersymbol interference caused by frequency selective fading (which results from a multipath channel), a portion of each transformed symbol may be repeated to form a corresponding OFDM symbol. OFDM symbols generated in this manner for different symbol periods are then processed to generate the downlink modulated signal that is transmitted to the terminals.

For the downlink, if the M usable carriers are all transmitted at the same power level, then the PAPR of the OFDM waveform can be large. However, by assigning more carriers to terminals with lower required transmit powers and fewer carriers to terminals with higher required transmit powers, the PAPR of the waveform will be smaller. This would then allow the power amplifier at the access point to be operated with a smaller back-off and at a higher output power level. This may in turn allow higher data rates to be used for one or more of the terminals.

The techniques described herein for managing PAPR for multi-carrier modulation may be implemented by various means. For example, these techniques may be implemented in hardware, software, or a combination thereof. For a hardware implementation, the elements used to implement the techniques at each of the access point and the terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory units 622 and 662 in FIG. 6) and executed by a processor (e.g., controllers 620 and 660 and scheduler 630). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of managing peak-to-average power ratio (PAPR) for multi-carrier modulation in a wireless multi-carrier communication system, comprising:
   determining a maximum number of carriers that may be allocated to each terminal in a plurality of terminals based on a required transmit power for the terminal;
   computing a difference between a maximum transit power for the terminal and the required transmit power for the terminal, wherein determining the maximum number of carriers that may be allocated to the terminal comprises comparing the computed difference against required back-off values for different numbers of carries, and selecting from the different number of carriers a number of carriers associates with a largest required back-off value that is smaller than the computed difference; and
   allocating to each terminal a specific number of carriers that is less than or equal to the maximum number of carriers determined for the terminal.

2. The method of claim 1, further comprising:
   assigning specific carriers to each terminal in a manner to reduce out-of-band emissions.

3. The method of claim 2, wherein a terminal associated with a higher required transmit power is assigned carriers located near the middle of an operating band and a terminal associated with a lower required transmit power is assigned carriers located near an edge of the operating band.

4. The method of claim 2, wherein the assigning specific carriers to each terminal comprises:
   determining a set of carriers that can be assigned to the terminal based on the required transmit power for the terminal, and
   selecting the specific carriers to assign to the terminal from the set of carriers.

5. The method of claim 1, further comprising:
   transmitting data for each terminal on the specific number of carriers allocated to the terminal and at the required transmit power for the terminal.

6. The method of claim 1, further comprising:
   receiving a data transmission from each terminal on the specific number of carriers allocated to the terminal.

7. The method of claim 1, wherein the specific number of carriers allocated to each terminal is further based on a total number of carriers available for allocation to the plurality of terminals.

8. The method of claim 1, wherein the specific number of carriers allocated to each terminal is further based on at least one additional factor.

9. The method of claim 8, wherein the at least one additional factor includes a factor that relates to amount of data to transmit.

10. The method of claim 1, wherein the required transmit power for each terminal is determined based on a required received signal quality for the terminal.

11. The method of claim 1, wherein the required transmit power for each terminal is determined based on a power control loop maintained for the terminal.

12. The method of claim 1, wherein the wireless communication system implements orthogonal frequency division multiplexing (OFDM).

13. A method of allocating carriers to manage peak-to-average power ratio (PAPR) in a wireless communication system that implements orthogonal frequency division multiplexing (OFDM), comprising:
   determining a maximum number of carriers that may be allocated to each terminal in a plurality of terminals based on a required transmit power for the terminal;
   computing a difference between a maximum transit power for the terminal and the required transmit power for the terminal, wherein the determining the maximum number of carriers that may be allocated to the terminal is based on the computed difference;
   allocating to each terminal a specific number of carriers that is less than or equal to the maximum number of carriers determined for the terminal; and
   assigning specific carriers to each terminal in a manner to reduce out-of-band emissions,
   wherein the determining comprises comparing the computed difference against required back-offs for different numbers of carriers, and wherein the maximum number of carriers that may be allocated to the terminal is equal to the number of carriers associated with a largest required back-off that is smaller than the computed difference.

14. An apparatus in a wireless multi-carrier communication system, comprising:
   means for determining a maximum number of carriers that may be allocated to each terminal in a plurality of terminals based on a required transmit power for the terminal;
   means for computing a difference between a maximum transit power for the terminal and the required transmit power for the terminal, wherein the means for determining the maximum number of carriers that may be allocated to the terminal is based on the computed difference; and
   means for allocating to each terminal a specific number of carriers that is less than or equal to the maximum number of carriers determined for the terminal;
   wherein the means for determining for each terminal further comprises means for comparing the computed difference against required back-offs for different numbers of carriers, and wherein the maximum number of carriers that may be allocated to the terminal is equal to the number of carriers associated with a largest required back-off that is smaller than the computed difference.

15. The apparatus of claim 14, further comprising:
   means for assigning specific carriers to each terminal in a manner to reduce out-of-band emissions.

16. The apparatus of claim 14, further comprising:
   means for receiving a data transmission from each terminal on the specific number of carriers allocated to the terminal.

17. The apparatus of claim 14, further comprising:
   means for transmitting data to each terminal on the specific number of carriers allocated to the terminal and at the required transmit power for the terminal.

18. An access point in a wireless multi-carrier communication system, comprising:
   a scheduler operative to determine a maximum number of carriers that may be allocated to each terminal in a plurality of terminals based on a required transmit power for the terminal, to compute a difference between a maximum transmit power for the terminal and the required transmit power for the terminal, wherein the scheduler operative to determine the maximum number of carriers that may be allocated to the terminal is operative to compare the computed difference against required back-off values for different numbers of carries, and select from the difference number of carriers a number of carriers associated with a largest required back-off value that is smaller than the computed difference and wherein the scheduler is further operative to allocate to each terminal a specific number of carriers that is less than or equal to the maximum number of carriers determined for the terminal, and provide carrier assignments indicative of the specific number of carriers allocated to each terminal; and
   a transmit data processor operative to process the carrier assignments for transmission to the plurality of terminals.

19. A method of transmitting data using multi-carrier modulation in a wireless communication system, comprising:
   receiving an allocation of a specific number of carriers to be used by a terminal for data transmission, wherein the specific number of carriers is less than or equal to a maximum number of carriers that may be used for data transmission, wherein the maximum number of carriers is determined based on a difference between a maximum transmit power for the terminal and a required transmit power for the terminal, and wherein the maximum number of carriers allocated to the terminal is based on a comparison of the computed difference against required back-off values for different numbers of carriers, and a number of carriers associated with a largest required back-off that is smaller than the computed difference being selected from the different number of carriers; and
   transmitting data using the specific number of carriers.

20. The method of claim 19, wherein data is transmitted on specific carriers that have been assigned to reduce out-of-band emissions.

21. An apparatus in a wireless multi-carrier communication system, comprising:
   means for receiving an allocation of a specific number of carriers to be used by a terminal for data transmission, wherein the specific number of carriers is less than or equal to a maximum number of carriers that may be used for data transmission, wherein the maximum number of carriers is determined based on a difference between a maximum transmit power for the terminal and a required transmit power for the terminal, wherein the maximum number of carriers allocated to the terminal is based on a comparison of the computed difference against required back-off values for different numbers of carriers, and a number of carriers associated with a largest required back-off that is smaller than the computed difference being selected from the different number of carriers; and
   means for transmitting data using the specific number of carriers.

22. The method of claim 1, wherein the required back-offs associated with the numbers of carriers are determined based upon a lookup table.

23. The method of claim 1, wherein a larger back-off is associated with larger numbers of carriers, and a smaller back-off is associated with fewer numbers of carriers.

24. A non-transitory computer-readable medium, comprising:
   code for causing a computer to:
   receive an allocation of a specific number of carriers to be used by a terminal for data transmission, wherein the specific number of carriers is less than or equal to a maximum number of carriers that may be used for data transmission, wherein the maximum number of carriers is determined based on a difference between a maximum transmit power for the terminal and a required transmit power for the terminal, and wherein the maximum number of carriers allocated to the terminal is based on a comparison of the computed difference against required back-off values for different numbers of carriers, and a number of carriers associated with a largest required back-off that is smaller than the computed difference being selected from the different number of carriers; and
   transmit data using the specific number of carriers.

25. A non-transitory computer-readable medium, comprising:
   code for causing a computer to:
   determine a maximum number of carriers that may be allocated to each terminal in a plurality of terminals based on a required transmit power for the terminal;
   compute a difference between a maximum transmit power for the terminal and the required transmit power for the terminal, wherein the code to determine the maximum number of carriers that may be allocated to the terminal comprises code to compare the computed difference against required back-offs for different numbers of carriers, wherein a number of carriers associated with a largest required back-off that is smaller than the computed difference is selected from the different number of carriers; and allocate to each terminal a specific number of carriers that is less than or equal to the maximum number of carriers determined for the terminal.

26. An apparatus in a wireless multi-carrier communication system, comprising:

a receive data processor operative to receive an allocation of a specific number of carriers to be used by a terminal for data transmission, wherein the specific number of carriers is less than or equal to a maximum number of carriers that may be used for data transmission, wherein the maximum number of carriers is determined based on a difference between a maximum transmit power for the terminal and a required transmit power for the terminal, and wherein the maximum number of carriers allocated to the terminal is based on a comparison of the computed difference against required back-off values for different numbers of carriers, and a number of carriers associated with a largest required back-off that is smaller than the computed difference being selected from the different number of carriers; and a transmit data processor operative to transmit data using the specific number of carriers.

27. The method of claim 1, wherein required transmit power for the terminal comprises an estimated required transmit power for the terminal.

28. The method of claim 1, wherein required transmit power for the terminal is based on information from a controller.

29. The method of claim 1, further comprising obtaining the required transmit terminal for each terminal in the plurality of terminals.

\* \* \* \* \*